US007302028B2

(12) United States Patent
Kim et al.

(10) Patent No.: US 7,302,028 B2
(45) Date of Patent: Nov. 27, 2007

(54) INSTRUMENTED CAPSULE FOR NUCLEAR FUEL IRRADIATION TESTS IN RESEARCH REACTORS

(75) Inventors: Bong Goo Kim, Daejeon (KR); Jong Myeong Oh, Daejeon (KR); Jae Min Shon, Daejeon (KR); Do Sik Kim, Daejeon (KR); Yoon Taeg Shin, Daejeon (KR); Sung Jae Park, Daejeon (KR); Kee Nam Choo, Daejeon (KR); Man Soon Cho, Daejeon (KR); Young Hwan Kang, Daejeon (KR)

(73) Assignee: Korea Atomic Energy Research Institute (KR)

( * ) Notice: Subject to any disclaimer, the term of this patent is extended or adjusted under 35 U.S.C. 154(b) by 0 days.

(21) Appl. No.: 10/899,922

(22) Filed: Jul. 26, 2004

(65) Prior Publication Data
US 2005/0105667 A1 May 19, 2005

(30) Foreign Application Priority Data
Jul. 31, 2003 (KR) .................. 10-2003-0053231

(51) Int. Cl.
*G21G 1/00* (2006.01)
(52) U.S. Cl. .............. 376/220; 376/340; 376/341; 376/342
(58) Field of Classification Search .............. 376/202, 376/340, 341, 342; 220/492; 250/505.1, 250/507.1
See application file for complete search history.

(56) References Cited

U.S. PATENT DOCUMENTS 4,581,197 A * 4/1986 Saverio ................ 376/247
4,637,913 A * 1/1987 Jacquot et al. ........... 376/247
4,780,267 A * 10/1988 Todt et al. .............. 376/254
5,225,149 A * 7/1993 Banda .................. 376/255
6,477,219 B2 * 11/2002 Hirukawa et al. ......... 376/255
6,782,069 B1 * 8/2004 Kang et al. ............. 376/258
2003/0227991 A1 * 12/2003 Kang et al. ............. 376/202

OTHER PUBLICATIONS

Kang et al., "Advanced Fuel Irradiation Experiments in the HANARO", ANES 2002, Oct. 16-18, 2002, Biltmore Hotel, Miami, Florida.*

Lee et al., "Thermal and mechanical characteristics of instrumented capsule for a material irradiation test," Nuclear Engineering and Design, vol. 205, Issues 1-2, Mar. 2001, pp. 205-212.*

KR Patent No. 10-0296946, entitled A Remote Non-Instrumented Capsule . . . , By Bae et al., published Sep. 26, 2001.

(Continued)

*Primary Examiner*—Ricardo J. Palabrica
(74) *Attorney, Agent, or Firm*—Bachman & LaPointe, P.C.

(57) ABSTRACT

An instrumented capsule for nuclear fuel irradiation tests in research reactors includes an outer shell; a rod tip assembly assembled to a lower end plate of the shell, thus absorbing impact; fuel rod assemblies supported in the shell by means of support tubes and housing therein, sintered fuel bodies and in-capsule instruments, such as thermocouples and self-powered neutron detectors (SPND); a protective tube connected to the upper end plate and protecting instrument control cables; and a guide pipe connected to the inclined extension part of a junction tree and guiding the instrument control cables to a control unit provided outside the reactor.

6 Claims, 16 Drawing Sheets

OTHER PUBLICATIONS

KR Patent No. 10-0435226, Non-Instrumented Capsule for a Nuclear . . . , By Kang et al., published Jun. 9, 2004.

Yasuo Arai et al., Fabrication of Uranium-Plutonium Mixed Carbide Fuel Pins for JMTR Irradiation Capsules, 84F-10A, 84F-12A and 87F-2A, Apr. 26, 1989.

Mitsuo Akabori et al., Effect of Irradiation Temperature on Irradiation-Induced Lattice Parameter Change in ThO2-base Fuels (JRR-2, VOF-18H Capsule), Jan. 29, 1987.

R.A. Robinson et al., Instrumented Capsule for In-Reactor Fuel Creep Studies at High Fission Rates, Oct. 24, 1972.

J. L. Scott et al., An Irradiation Test of Bonded HTGR Coated Particle Fuels in an Instrumented Capsule for HFIR, Mar. 1972.

* cited by examiner

INSTRUMENTED CAPSULE FOR NUCLEAR FUEL IRRADIATION TESTS IN RESEARCH REACTORS

BACKGROUND OF THE INVENTION

1. Field of the Invention

The present invention relates, in general, to instrumented capsules for nuclear fuel irradiation tests in research reactors and, more particularly, to an instrumented capsule for nuclear fuel irradiation tests in research reactors, which is used to measure in real time the properties of nuclear fuels irradiated in a research reactor during a nuclear fuel irradiation test, thus providing nuclear fuel irradiation test data required for the design of nuclear fuels and the determination of in-pile performance and structural integrity of nuclear fuels.

2. Description of the Related Art

In the related art, nuclear fuel irradiation tests and material irradiation tests in research reactors have been actively executed using irradiation testing facilities, such as capsules or loops. Of the irradiation testing facilities, the capsules which are in-pile testing facilities used in research reactors to execute nuclear fuel irradiation tests are classified into instrumented capsules and non-instrumented capsules. The instrumented capsules are testing facilities in which a variety of measuring instruments are installed in the shell of a capsule to measure the properties of irradiated nuclear fuel, such as the temperature of the irradiated nuclear fuel and the inner pressure and strain of irradiated nuclear fuel rods, and determine in-capsule irradiation test data, such as the quantity of neutron radiation and the temperature, flow quantity and flow rate of coolant. In the meantime, the non-instrumented capsules are testing facilities, the shells of which are not provided with such measuring instruments.

In recent years, the irradiation tests for nuclear reactor materials, nuclear fuels and other nuclear materials by the use of research reactors have been actively studied and executed. Particularly, the requirements for irradiation tests using research reactors have rapidly increased to provide: in-pile irradiation test data for pressure vessels and in-core materials of nuclear reactors in an effort to lengthen the life spans of commercial reactors; in-pile irradiation test data for in-core materials and pressure pipe materials of heavy water reactors in an effort to develop advanced materials for the reactors; and in-pile irradiation test data required for the development of advanced nuclear fuels for pressurized light water reactors, proliferation-resistant oxide nuclear fuels, nuclear fuels for next generation reactors and advanced sheath materials. Thus, a variety of irradiation test facilities which are thermohydraulically and mechanically compatible with in-core irradiation holes of research reactors and agreeable with irradiation test properties of materials have been developed and utilized. In addition, to provide further improved irradiation test facilities, many improvements to the facilities have been attempted.

To provide in-pile test data for design and performance qualification of nuclear fuels for commercial nuclear power plants and in-pile test data for qualifying in-pile performance and structural integrity of nuclear fuels to develop advanced nuclear fuels suitable for a variety of nuclear reactors, such as next generation reactors, irradiation tests using research reactors must be carried out.

To execute the irradiation tests in the research reactors, the non-instrumented capsules and instrumented capsules for the irradiation tests are installed in the irradiation holes of the research reactors to qualify in real time the properties of a variety of nuclear fuels, such as metal fuels and ceramic fuels, during the irradiation tests. In such a case, the capsules must be designed to be thermohydraulically and mechanically compatible with the irradiation holes. Furthermore, the capsules must be prevented from causing mechanical damage to the inner surfaces of the irradiation holes due to in-pile liquid vibration despite being installed in the irradiation holes for lengthy periods. In addition, the capsules must exhibit desired structural integrity and operational reliability thereof even though the capsules are irradiated in the research reactors for lengthy periods. Furthermore, the capsules must be constructed to allow the in-capsule instruments, nuclear fuel rods, fuel rod assemblies, and capsule shells to be easily assembled and disassembled through remote controls from hot cells.

An example of conventional non-instrumented capsules for nuclear fuel irradiation tests may be referred to Korean Patent Registration No. 296946, entitled "Remote-controlled Non-instrumented Capsule for Nuclear Fuel Irradiation Tests". The above-mentioned non-instrumented capsule can be used in a nuclear fuel irradiation test for a short period, three months to six months, while testing three kinds of sintered nuclear fuels at the same time.

However, the use of the non-instrumented capsule of No. 296946 is limited to an irradiation test for one nuclear fuel rod assembly having three irradiation test fuel rods. Furthermore, the non-instrumented capsule is problematic in that the capsule has a weak welded structure so that some welded parts thereof, such as a collar welded to a rod tip provided at a lower portion of the capsule, may be broken if excessive force is imposed on the welded parts during a process of assembling the capsule. In addition, the capsule is not able to resist wear or breakage induced by in-pile liquid vibration, and furthermore, may damage the inner wall of the irradiation hole caused by the wear.

Furthermore, the above-mentioned non-instrumented capsule is unable to accommodate irradiation growth of structural materials of nuclear fuels, such as sheath materials of fuel rods, induced by lengthy period neutron irradiation, so that the capsule is limited in terms of structural integrity and safety thereof in the irradiation hole when the capsule is used in a nuclear fuel irradiation test for a lengthy period, six months to three years.

Another example of conventional non-instrumented capsules for nuclear fuel irradiation tests may be referred to Korean Patent Application No. 2001-81880, entitled "Non-instrumented Capsule for Nuclear Fuel Irradiation Tests in Irradiation Holes of Research Reactors". This non-instrumented capsule was developed to solve the problems experienced in the capsule of No. 296946, and has many advantages as follows. That is, the non-instrumented capsule of No. 2001-81880 enhances its structural integrity and safety, thus solving the conventional problems in that the capsule may be easily worn or broken due to external force imposed thereon during the process of assembling the capsule or due to the in-pile liquid vibration. Furthermore, the capsule of No. 2001-81880 has a structure capable of accommodating irradiation growth of fuel rods, thus being effectively used in a lengthy irradiation test. In addition, the capsule includes a thermo-neutron absorption tube capable of allowing for control of linear power density of the nuclear fuel in the irradiation hole.

However, the non-instrumented capsule of No. 2001-81880 having the above-mentioned advantages is problematic in that the capsule does not allow for real time measurement of the properties of the nuclear fuels irradiated in the irradiation hole during an irradiation test.

SUMMARY OF THE INVENTION

Accordingly, the present invention has been made keeping in mind the above problems occurring in the prior art, and an object of the present invention is to provide an instrumented capsule for nuclear fuel irradiation tests in research reactors which allows for easy assembling and disassembling of the in-capsule instruments, nuclear fuel rod assemblies and elements of the capsule, enhances the mechanical integrity and safety of elements of both the capsule and the nuclear fuel assemblies irradiated in the irradiation hole of a research reactor, accommodates dimensional changes of irradiation test fuel rods induced by irradiation growth during neutron irradiation, and measures and determines the properties of the nuclear fuels during the irradiation test.

In order to accomplish the above object, the present invention provides an instrumented capsule for nuclear fuel irradiation tests in research reactors, including a capsule part comprising: an outer shell with a predetermined length and opposite open ends; one or more nuclear fuel rod assemblies loaded in the outer shell and each having a plurality of irradiation test fuel rods each containing a sintered nuclear fuel body therein; a plurality of support tubes inserted into the outer shell to support the plurality of fuel rod assemblies in a predetermined place in the outer shell; an upper end plate and a lower end plate mounted to an upper end and a lower end of the outer shell, respectively, with a plurality of coolant flow channels formed in each of the upper and lower end plates; and a rod tip assembly comprising: a rod tip inserted into the lower end plate; a support spring supported by both the lower end plate and the rod tip to support the weight of the instrumented capsule; and a rod tip support ring coupled to an upper end of the rod tip which passes upwards through the lower end plate; a plurality of in-capsule instruments including: a thermocouple installed in the sintered nuclear fuel body of each of the fuel rod assemblies, with an instrument control cable extending from the thermocouple to an outside of the capsule part; and a self-powered neutron detector (SPND) placed in a housing support rod of each of the fuel rod assemblies, with an instrument control cable extending from the SPND to the outside of the capsule part; a protective tube connected to a top of the upper end plate by means of an upper end plate connector, and protecting the instrument control cables extending from the in-capsule instruments to the outside of the capsule part; a junction tree connected to an upper end of the protective tube and having both a vertical extension part and an inclined extension part, with a cable connection adapter provided at an upper end of the inclined extension part to hold the instrument control cables; a guide pipe connected to the inclined extension part through the cable connection adapter and guiding the instrument control cables to a control unit provided outside the research reactor; and a grapple head assembly connected to an upper end of the vertical extension part to be coupled to a capsule treatment system.

The in-capsule instruments may further include a combination of a linear variable differential transformer (LVDT) and a bellows-shaped pressure gauge to measure variation in an inner pressure of each of the irradiation test fuel rods, or a combination of a linear variable differential transformer (LVDT) and a strain gauge to measure variation in length of the sintered nuclear fuel body of each of the irradiation test fuel rods.

The instrumented capsule may further comprise: an upper end cap provided around an upper end of an outer surface of the upper end plate; a lower end cap provided around an outer surface of a junction of the outer shell and the lower end plate; a lower stopper provided around an outer surface of the protective tube at a predetermined position corresponding to an upper portion of an irradiation hole in a reflector of the research reactor, thus being in contact with the upper portion of the irradiation hole, the lower stopper having a plurality of coolant flow channels; and an upper stopper provided around the outer surface of the protective tube at a predetermined position at which the upper stopper is locked to a locking clamp provided at an upper portion of a chimney of the research reactor.

In the instrumented capsule, each of the upper end cap and the lower end cap may be made of aluminum or an aluminum alloy which is softer than in-core materials of the research reactor to protect the reactor from damage.

The instrumented capsule may further comprise a cable guide tube for guiding the instrument control cables in the capsule part. The cable guide tube is supported at a lower end thereof by the center of the upper surface of the upper housing of the fuel rod assemblies and at an upper end thereof by the lower surface of the upper end plate.

In the meantime, each of the fuel rod assemblies comprises: a cooling block placed between a lower housing and an upper housing which support the irradiation test fuel rods and housing support rods; a cooling block support tube longitudinally passing through the cooling block and locked to the lower housing at a lower end thereof and to the upper housing at an upper end thereof, thus supporting the cooling block; three irradiation test fuel rods each containing sintered nuclear fuel bodies therein and placed in the cooling block such that the lower ends of the fuel rods are locked to fuel rod installation holes of the lower housing, while the upper ends of the fuel rods are locked to fuel rod locking slots of the upper housing; a plurality of hold-down springs fitted over the lower ends of the fuel rods and supported on the upper surface of the lower housing so that the hold-down springs accommodate dimensional changes of the fuel rods induced by irradiation growth during neutron irradiation; three housing support rods passing through the cooling block so that upper ends of the housing support rods are locked to the support rod locking slots of the upper housing, while lower ends of the housing support rods pass through support rod installation holes of the lower housing so as to protrude downwards from the lower end of the lower housing; and a plurality of housing nuts with washers tightened to the lower ends of the housing support rods which protrude downwards from the lower end of the lower housing, so that the irradiation test fuel rods are securely installed in each of the fuel rod assemblies.

Each of the irradiation test fuel rods comprises: a sheath tube; a lower end plug which closes the lower end of the sheath tube; an upper end connector mounted to the upper end of the sheath tube; lower alumina spacers placed in a lower portion of the sheath tube; sintered nuclear fuel bodies placed in the sheath tube at positions above the lower alumina spacers; upper alumina spacers having thermocouple installation holes to support thermocouples therein and placed above the sintered nuclear fuel bodies; a plenum spring installed in the sheath tube at a position between the upper end connector and the upper alumina spacers; and an end connector sealing nut tightened to the upper end connector.

The sintered nuclear fuel bodies loaded in each of the irradiation test fuel rods comprise first and second sintered fuel bodies each having a hole to receive the thermocouple therein, and a third sintered fuel body without having any hole. In each of the irradiation test fuel rods, the end of the thermocouple is placed in the sintered nuclear fuel bodies.

Each of the housing support rods comprises an SPND installation hole of a predetermined depth which is formed downwards from the center of the upper surface of each housing support rod.

When the thermocouple is installed in the irradiation test fuel rod through a thermocouple insert hole, the end connector sealing nut is tightened to the upper end of the upper end connector with a sealing tube provided around a thermocouple control cable which is placed at the upper end of the upper end connector, so that the thermocouple insert hole of the upper end connector is sealed.

Furthermore, a thermo-neutron absorption tube may be placed between the upper housing and the lower housing of the nuclear fuel rod assemblies. The thermo-neutron absorption tube provides flexibility allowing for controlling the linear power density of the nuclear fuels in the irradiation hole according to in-core properties of the research reactor.

BRIEF DESCRIPTION OF THE DRAWINGS

The above and other objects, features and other advantages of the present invention will be more clearly understood from the following detailed description taken in conjunction with the accompanying drawings, in which:

FIGS. 3a through 3d are latitudinal sectional views illustrating the instrumented capsule for nuclear fuel irradiation tests of FIG. 2, in which:

FIG. 3a is a sectional view taken along the line A-A of FIG. 2;

FIG. 3b is a sectional view taken along the line B-B of FIG. 2;

FIG. 3c is a sectional view taken along the line C-C of FIG. 2; and

FIG. 3d is a sectional view taken along the line D-D of FIG. 2;

FIGS. 5a through 5c are enlarged sectional views illustrating several parts of the instrumented capsule for nuclear fuel irradiation tests of FIG. 2, in which:

FIG. 5a is a longitudinal sectional view of a part E of FIG. 2;

FIG. 5b is a longitudinal sectional view of a part F of FIG. 2; and

FIG. 5c is a longitudinal sectional view of a part G of FIG. 2;

FIGS. 9a through 9c are sectional views illustrating several parts of the nuclear fuel rod assembly according to the embodiment of the present invention, in which:

FIG. 9a is a latitudinal sectional view of a lower housing;

FIG. 9b is a latitudinal sectional view of an upper housing; and

FIG. 9c is a longitudinal sectional view illustrating the nuclear fuel rod assembly having a neutron absorption tube;

DETAILED DESCRIPTION OF THE INVENTION

Figure 1:
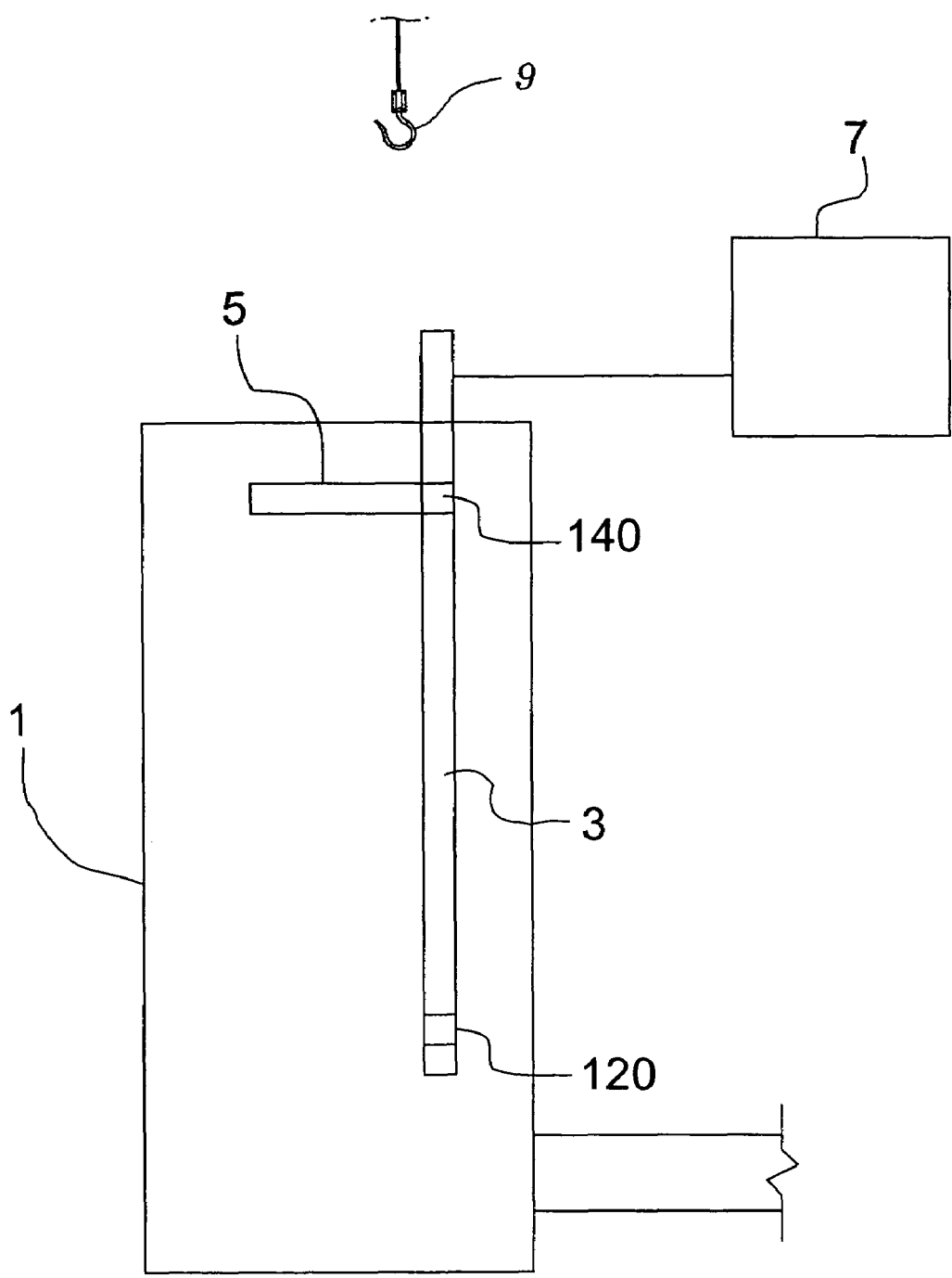
FIG. 1 is a schematic view showing an instrumented capsule according to a preferred embodiment of the present invention which performs a nuclear fuel irradiation test.

Reference should now be made to the drawings, in which the same reference numerals are used throughout the different drawings to designate the same or similar components.

The instrumented capsule for nuclear fuel irradiation tests in research reactors 1 according to the present invention comprises a capsule part which houses therein a plurality of nuclear fuel rods which are subjected to an irradiation test, a plurality of in-capsule instruments which is installed in the capsule part and connected to a control unit 7 provided outside a research reactor 1 to measure in real time the properties of irradiated nuclear fuels of the fuel rods during the irradiation test, and a connection/treatment part which guides a plurality of instrument control cables extending from the in-capsule instruments of the capsule part to the control unit provided outside the research reactor 1 while protecting the instrument control cables, and allows an operator to easily manipulate the capsule outside the reactor.

As shown in FIG. 1, a research reactor 1 comprises a chimney of reactor 3 in which is installed an instrumented capsule. A lower stopper 120 and an upper stopper 140 are mounted at predetermined lower and upper position in the chimney of reactor 3. A locking clamp 5 is provided at upper position of the chimney of reactor 3 to lock the chimney of reactor 3. A control unit 7 and a capsule treatment system 9 are installed outside the research reactor 1.

As shown in FIGS. 2 through 5, the capsule part comprises an outer shell 10 with a predetermined length and opposite open ends. One or more nuclear fuel rod assemblies 50, each of which has three irradiation test fuel rods 30 each containing sintered nuclear fuel bodies therein, are loaded in the outer shell 10. An upper support tube 13 and a lower support tube 11 are inserted into upper and lower ends of the outer shell 10 to support the fuel rod assemblies 50 in desired places in the shell 10. An upper end plate 60 and a lower end plate 70 are mounted to the upper and lower ends of the shell 10, respectively, with a plurality of coolant flow channels 63, 73 formed around a center through hole 61, 71 in each of the upper and lower end plates 60 and 70 to minimize impact induced by coolant flow in the shell 10. The capsule part further includes a rod tip assembly that comprises a rod tip 80, a support spring 85, and a rod tip support ring 87. The rod tip 80 is inserted into the center through hole 71 of the lower end plate 70 to move upwards and downwards, with a spring stop ring 81 provided around the rod tip 80 to limit vertical movement of the rod tip 80 relative to the lower end plate 70. The support spring 85 is fitted over the rod tip 80 to support the weight of the capsule. The rod tip support ring 87 is coupled to an upper end of the rod tip 80 which passes upwards through the center through hole 71 of the lower end plate 70.

Figure 5A:
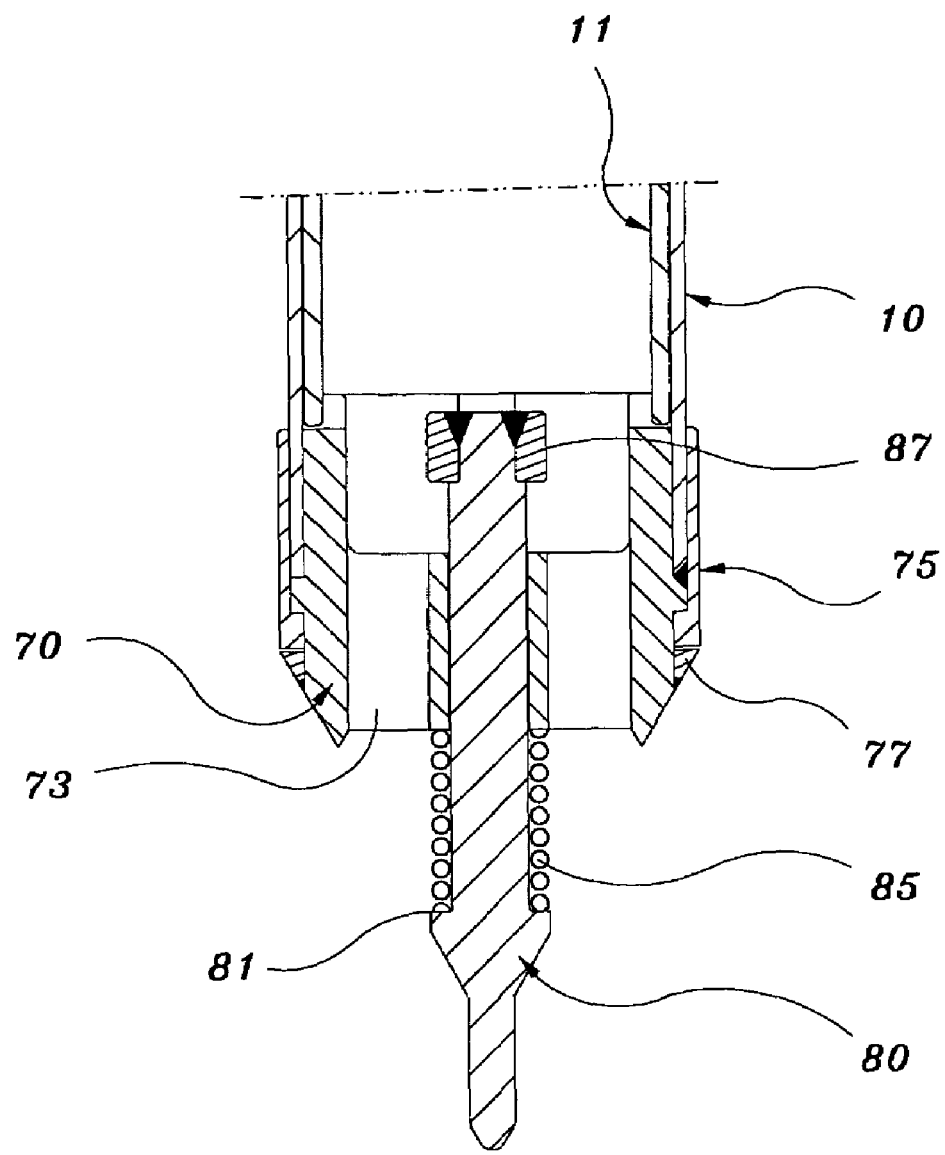

When the rod tip assembly is completely assembled to the lower end plate 70, the support spring 85 which is fitted over the rod tip 80 is stopped at both ends thereof by the spring stop ring 81 of the rod tip 80 and the lower surface of the lower end plate 70 as shown in FIG. 5a. During an irradiation test of the capsule installed in the irradiation hole of the research reactor, impact may be applied to the capsule. However, in the capsule of the present invention, such impact is absorbed by the rod tip 80 placed in contact with a bayonet provided on the bottom of the irradiation hole. Thus, the structure of the capsule is protected from impact.

Figure 5B:
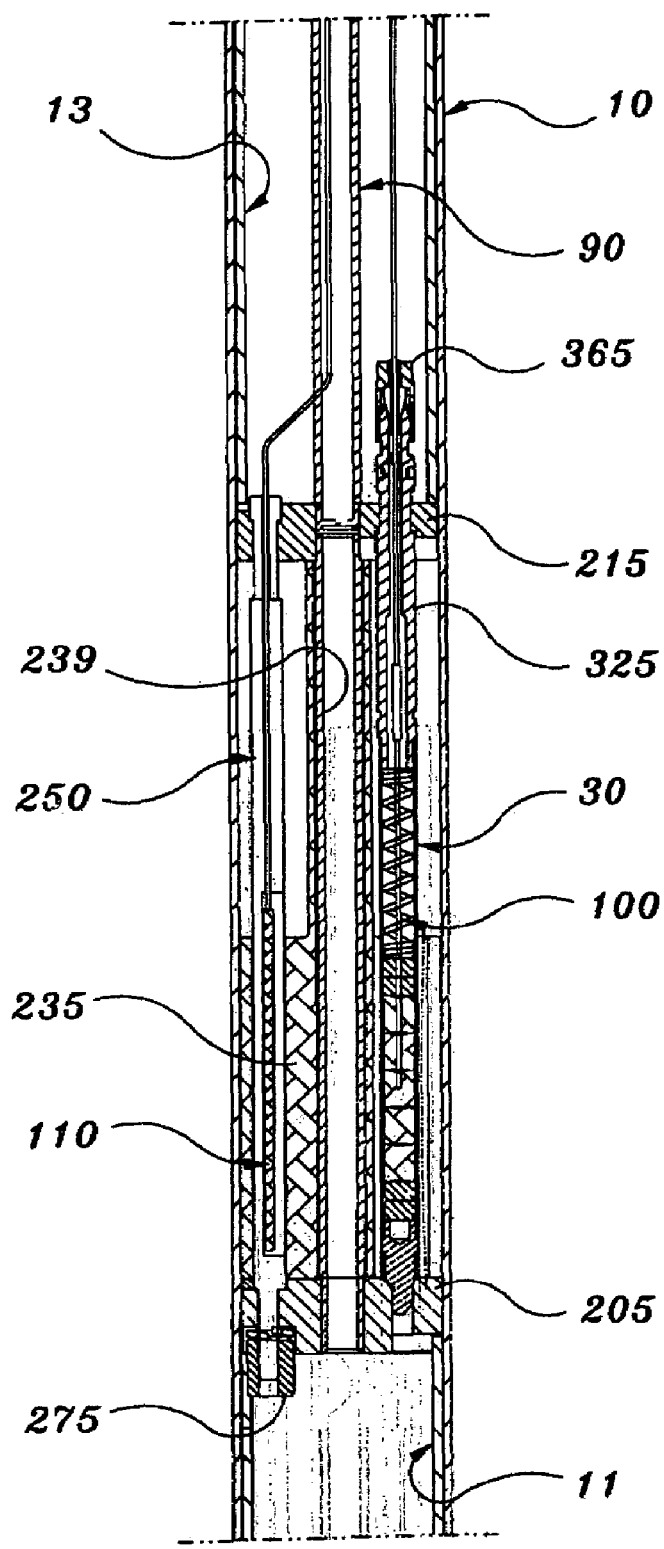

As shown in FIG. 5b, the in-capsule instruments housed in the outer shell 10 of the capsule part include three thermocouples 100 which are installed in the sintered nuclear fuel bodies of the fuel rod assemblies 50, with a plurality of instrument control cables extending from the thermocouples 100 to the outside of the capsule part so as to measure the temperatures of the irradiated nuclear fuel bodies. The in-capsule instruments also include three self-powered neutron detectors (SPND) 110 which are placed in housing support rods 250 of the fuel rod assemblies 50, with an instrument control cable extending from each SPND 110 to the outside of the capsule part. When necessary, the in-capsule instruments may further include a combination of a linear variable differential transformer (LVDT) 103 and a bellows-shaped pressure gauge 107 which may be installed on the sheath tube 305 of each fuel rod 30 to measure in real time variation in the inner pressure of each fuel rod 30, and/or a combination of a linear variable differential transformer (LVDT) 103 and a strain gauge which is not shown in the accompanying drawings but may be installed on the sheath tube 305 of each fuel rod 30 to measure in real time variations in the lengths of the sintered nuclear fuel bodies of each fuel rod 30.

Figure 5C:
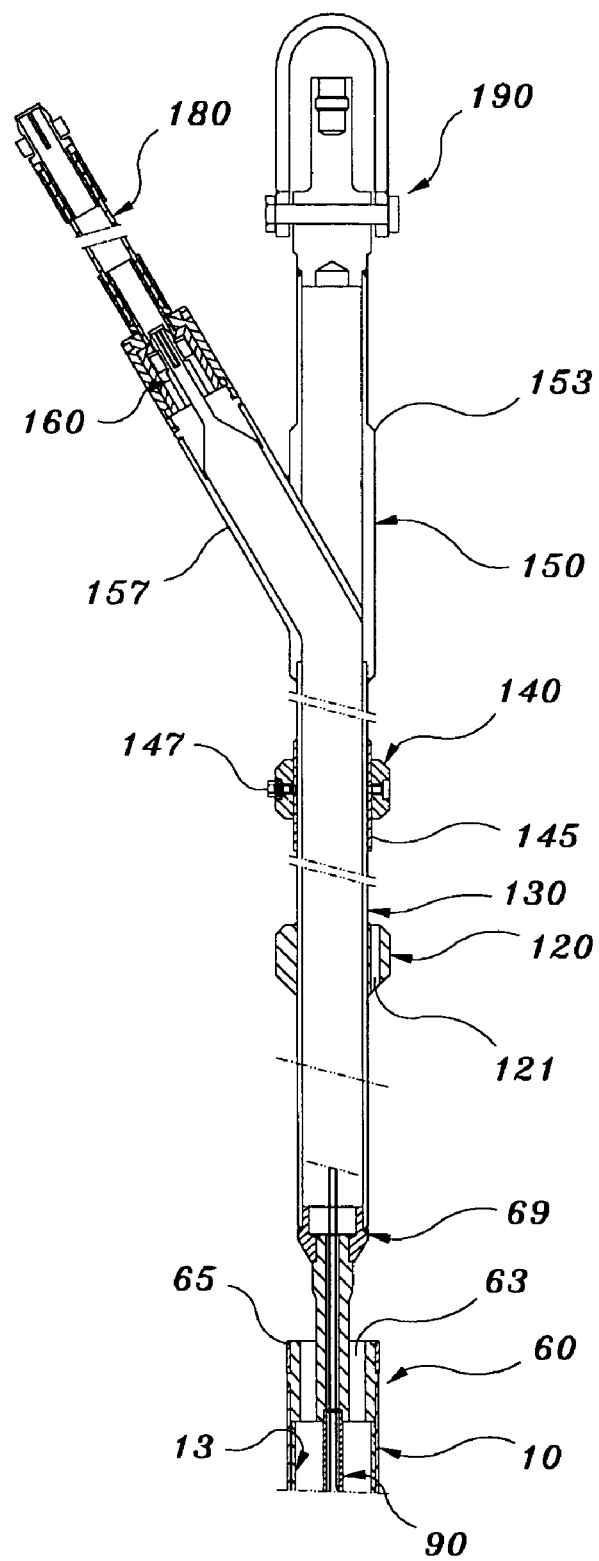
Figure 5D:
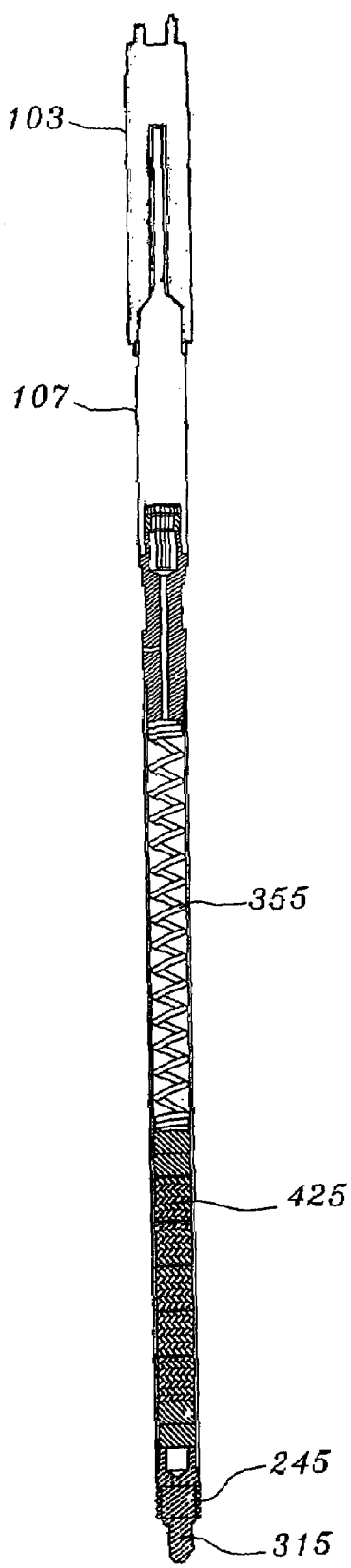
FIG. 5d is a sectional view of an example of a nuclear fuel rod assembly in the instrumented capsule of FIG. 2.
Figure 6:
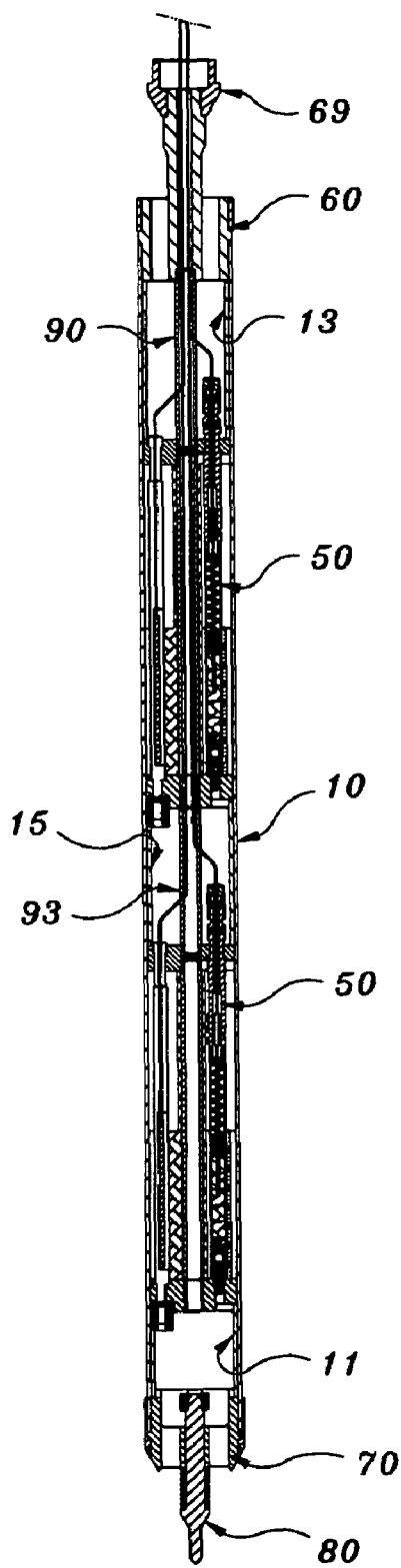
FIG. 6 is a longitudinal sectional view of a capsule part of the instrumented capsule for nuclear fuel irradiation tests according to a modification of the embodiment of the present invention.

As shown in FIG. 5c, the connection/treatment part of the non-instrumented capsule of the present invention comprises a protective tube 130, a junction tree 150, a guide pipe 180 and a grapple head assembly 190. The protective tube 130 is connected to the top of the upper end plate 60 by means of an upper end plate connector 69, and protects the instrument control cables extending from the in-capsule instruments, such as the thermocouples 100 and the SPNDs 110, to the outside of the capsule part. The junction tree 150 is connected to the upper end of the protective tube 130 and has two branch extension parts which are a vertical extension part 153 and an inclined extension part 157, with a cable connection adapter 160 provided at the upper end of the inclined extension part 157 to hold the plurality of instrument control cables. The guide pipe 180 is connected to the inclined extension part 157 through the cable connection adapter 160 and guides the instrument control cables extending from the capsule to the control unit provided outside the research reactor. The grapple head assembly 190 is connected to the upper end of the vertical extension part 153 to be coupled to a capsule treatment system 9 (See FIG. 1) such as an overhead crane positioned above a reactor pool.

Figure 2:
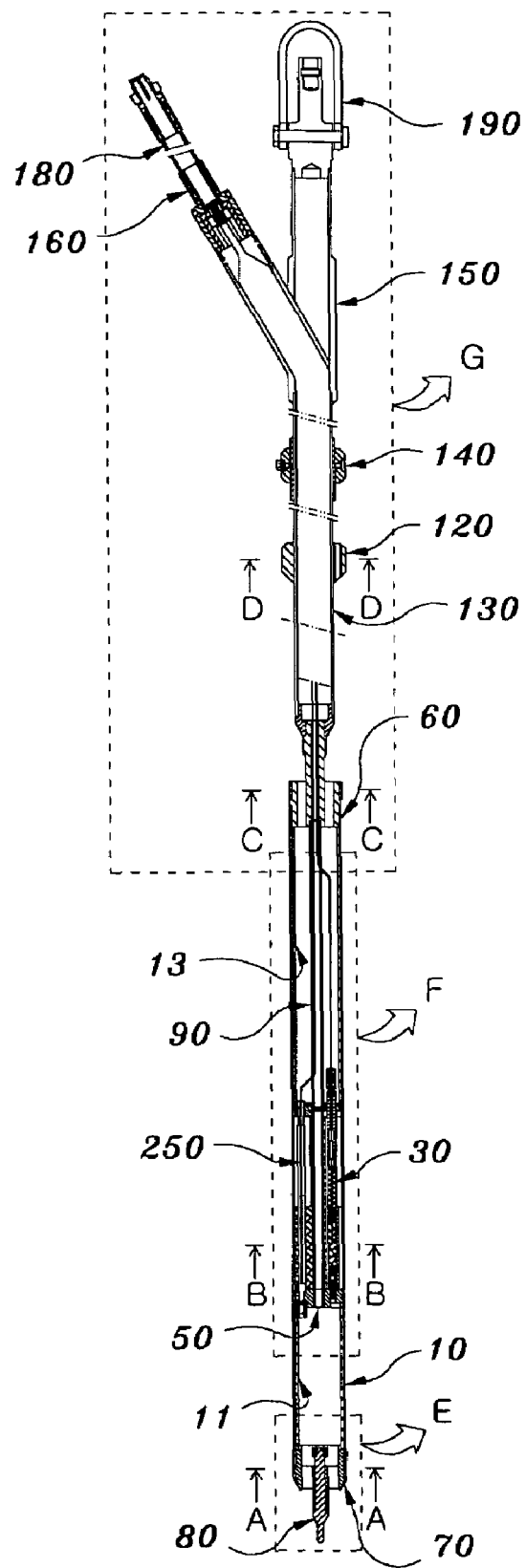
FIG. 2 is a longitudinal sectional view illustrating the instrumented capsule for nuclear fuel irradiation tests according to the embodiment of the present invention.

The capsule part preferably includes one or two nuclear fuel rod assemblies 50, and is limited in the number and lengths of the support tubes thereof according to the number of fuel rod assemblies 50. In other words, when one nuclear fuel rod assembly 50 is loaded in the outer shell 10 of the capsule part, two support tubes, including the upper support tube 13 and the lower support tube 11 with lengths controlled according to the position of the fuel rod assembly 50 in the outer shell 10, are installed in the outer shell 10 above and under the fuel rod assembly 50, respectively, as shown in FIG. 2. The lengths of the support tubes 13 and 11 may be controlled such that the fuel irradiation positions can be changed along a vertical direction in the reactor according to linear power densities of the fuel rods. Thus, it is possible to adjust the irradiation positions for the fuel rod assemblies 50 in an effort to accomplish desired linear power densities and desired combustion degrees of the nuclear fuels.

Figure 7:
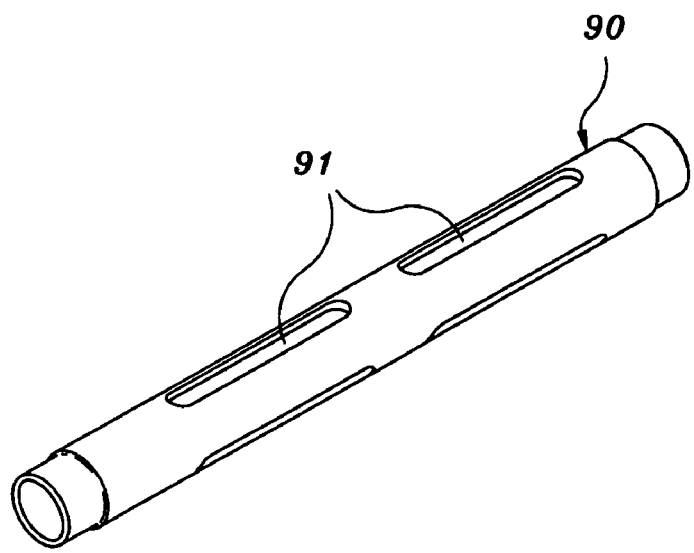
FIG. 7 is a perspective view of a cable guide tube for instrument control cables according to the embodiment of the present invention.

The capsule part also has cable guide tubes 90 and 93 for guiding instrument control cables. As shown in FIG. 7, each of the cable guide tubes 90 and 93 includes a plurality of longitudinal side openings 91. Thus, the instrument control cables extending from the fuel rod assemblies 50 pass through the openings 91 of the cable guide tubes 90 and 93, and thereafter, pass through the center through hole 61 of the upper end plate 60, thus being lead to the outside of the capsule part. Due to the cable guide tubes 90 and 93, the instrument control cables are effectively lead to the outside of the capsule part without failure even though many instruments are installed in the capsule part.

Figure 8:
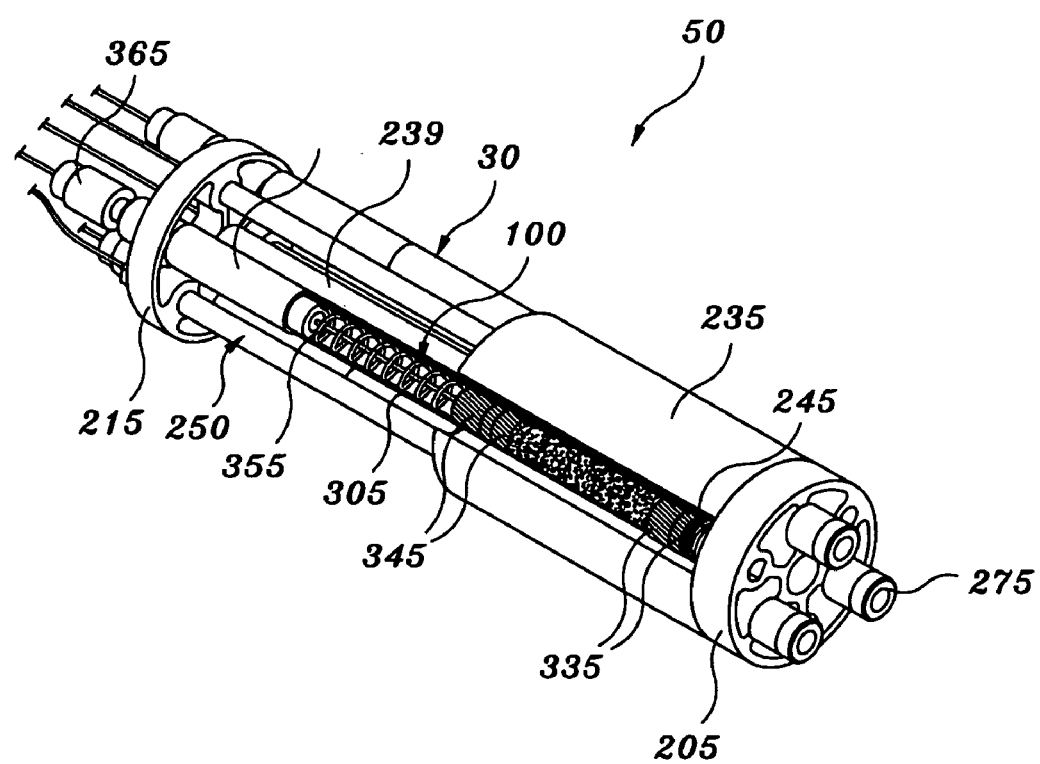
FIG. 8 is a partially broken perspective view of a nuclear fuel rod assembly according to the embodiment of the present invention.
Figure 9A:
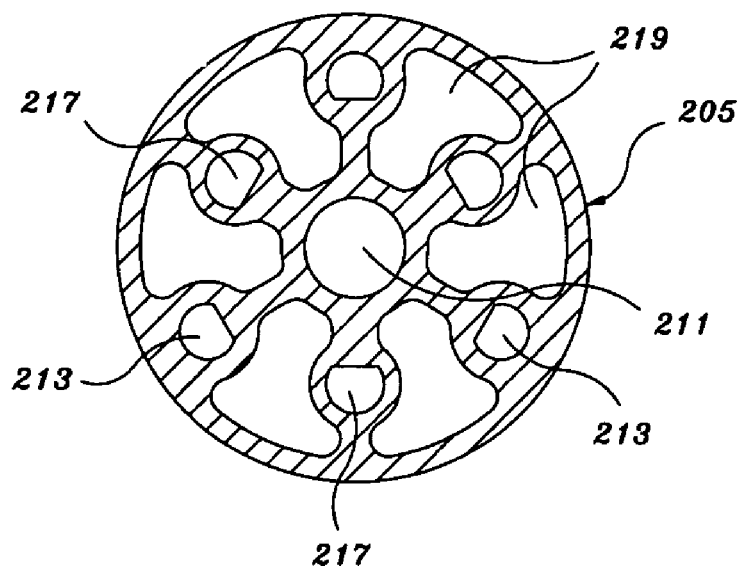
Figure 9B:
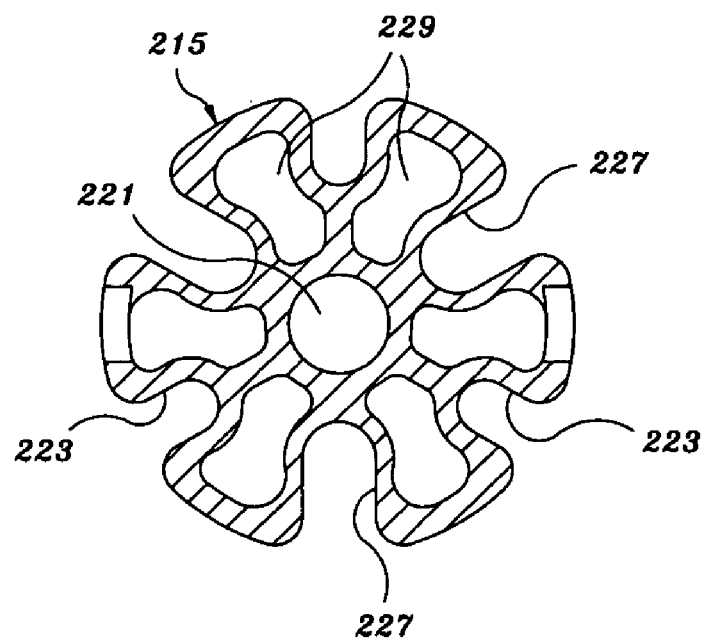

The nuclear fuel rod assemblies 50 installed in the capsule of the present invention will be described herein below with reference to FIGS. 5a, 5b, 5c, 8, 9a, 9b and 9c. As shown in the drawings, each of the fuel rod assemblies 50 comprises a lower housing 205, an upper housing 215, a cooling block 235, a cooling block support tube 239, three irradiation test fuel rods 30, three hold-down springs 245, three housing support rods 250, and a plurality of washers 265 and housing nuts 275. As best seen in FIG. 9a, the lower housing 205 comprises three support rod installation holes 213, three fuel rod installation holes 217 and six coolant flow channels 219 which are formed around a center hole 211 of the lower housing 205 while being spaced out at regular intervals. As best seen in FIG. 9b, the upper housing 215 comprises three support rod locking slots 223, three fuel rod locking slots 227 and six coolant flow channels 229 which are formed around a center hole 221 of the upper housing 215 while being spaced out at regular intervals. As shown in FIG. 8, the cooling block 235 is placed between the lower housing 205 and the upper housing 215. The cooling block support tube 239 longitudinally passes through the cooling block 235 and is locked to the lower housing 205 at a lower end thereof and to the upper housing 215 at an upper end thereof, thus supporting the cooling block 235 as shown in FIGS. 5b and 9b. The three irradiation test fuel rods 30, each containing sintered nuclear fuel bodies therein, are placed in the cooling block 235 such that the lower ends of the three fuel rods 30 are locked to the three fuel rod installation holes 217 of the lower housing 205, while the upper ends of the three fuel rods 30 are locked to the three fuel rod locking slots 227 of the upper housing 215. The hold-down springs 245 are fitted over the lower ends of the three fuel rods 30 and are supported on the upper surface of the lower housing 205 so that the hold-down springs 245 accommodate dimensional changes of the fuel rods 30 induced by irradiation growth during neutron irradiation. The three housing support rods 250 pass through the cooling block 235 so that upper ends of the housing support rods 250 are locked to the support rod locking slots 223 of the upper housing 215, while lower ends of the housing support rods 250 pass through the support rod installation holes 213 of the lower housing 205 so as to protrude downwards from the lower end of the lower housing 205. The housing nuts 275 with the washers 265 are tightened to the lower ends of the housing support rods 250 which protrude downwards from the lower end of the lower housing 205, so that the irradiation test fuel rods 30 are securely installed in each of the fuel rod assemblies.

Figure 10:
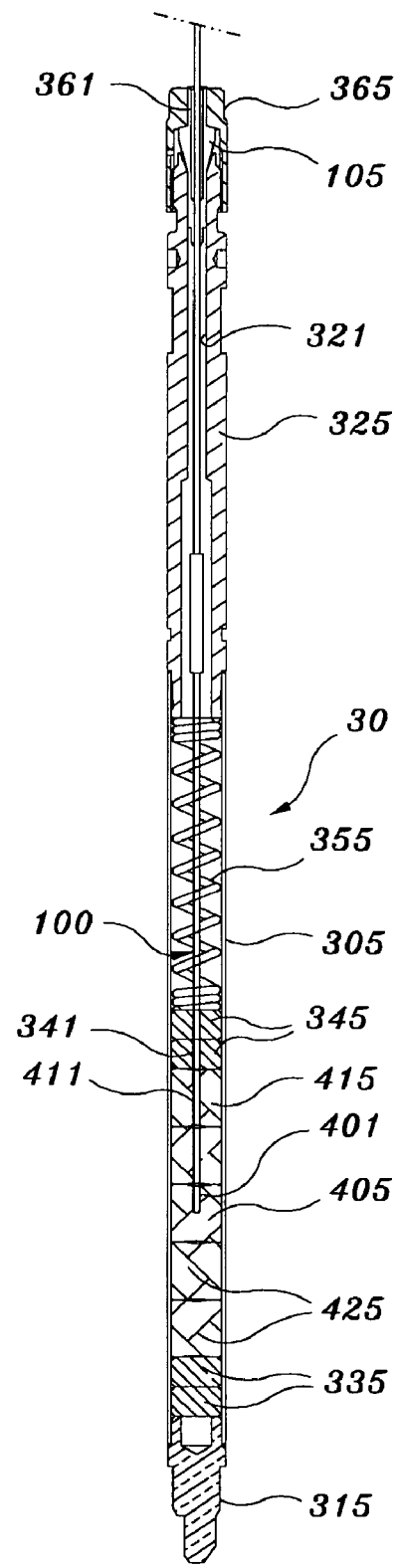
FIG. 10 is a longitudinal sectional view of a nuclear fuel rod assembly for irradiation tests according to the embodiment of the present invention.

As shown in FIG. 10, each of the irradiation test fuel rods 30 comprises a sheath tube 305, a lower end plug 315 which closes the lower end of the sheath tube 305, and an upper end connector 325 mounted to the upper end of the sheath tube 305. Lower alumina spacers 335 are placed in a lower portion of the sheath tube 305, while sintered nuclear fuel bodies 405, 415 and 425 are placed in the sheath tube 305 at positions above the lower alumina spacers 335. One or more upper alumina spacers 345, each having a thermocouple installation hole 341 to support a thermocouple 100 therein, are placed above the sintered nuclear fuel bodies 405, 415 and 425. A plenum spring 355 is installed in the sheath tube 305 at a position between the upper end connector 325 and the upper alumina spacers 345. Each of the irradiation test fuel rods 30 further includes an end connector sealing nut 365 which has a sealing tube coupling hole 361 and is tightened to an upper end of the upper end connector 325.

The sintered nuclear fuel bodies loaded in each of the irradiation test fuel rods 30 must be specifically shaped to install the thermocouple 100 therein. In other words, the sintered nuclear fuel bodies of each irradiation test fuel rod 30 comprise a first sintered fuel body 405, a second sintered fuel body 415 and a third sintered fuel body 425. The first sintered fuel body 405 has a hole of a predetermined depth which is formed downwards from the center of the upper surface of the fuel body 405. The second sintered fuel body 415, which has a center through hole 411 to allow the thermocouple 100 to pass through, is placed above the first fuel body 405, while the third sintered fuel body 425 which is a simple fuel body without having any hole is placed under the first fuel body 405.

The irradiation test fuel rods 30 having the above-mentioned construction can be controlled in the lengths of the sintered fuel bodies 405, 415 and 425, the length of the sheath tube 305, and the length of the upper end connector 325 according to an object of the irradiation test. When it is required to change the lengths of the sintered fuel bodies 405, 415 and 425, the sheath tube 305 and the upper end connector 325 as described above, the lengths of the cooling block 235, the cooling block support tube 239 and the housing support rods 250 must be changed.

Figure 11:
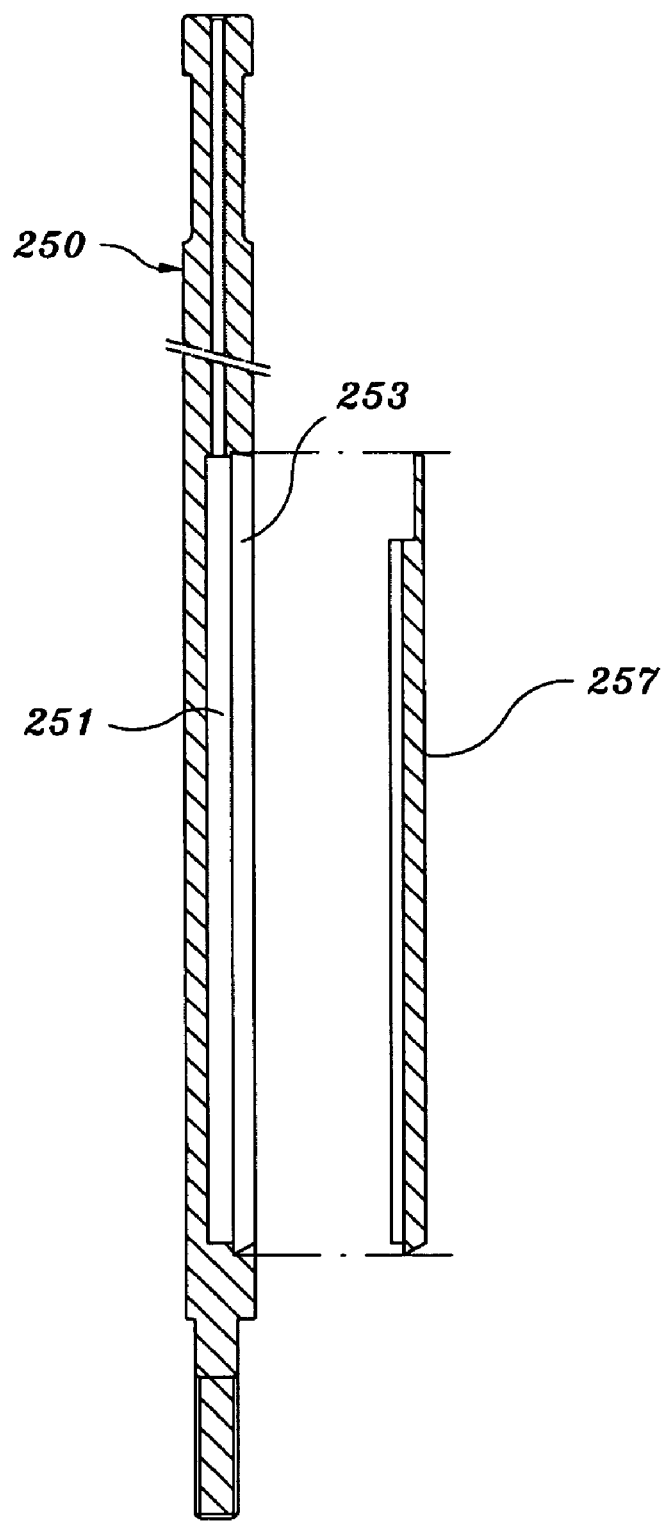
FIG. 11 is a longitudinal sectional view of a housing support rod for supporting an SPND according to the embodiment of the present invention.

Furthermore, an SPND installation hole 251 of a predetermined depth is formed downwards from the center of the upper surface of each of the housing support rods 250 as shown in FIG. 11, with an inlet slot 253 longitudinally formed along a sidewall of each of the housing support rods 250 at a position around the SPND installation hole 251. Thus, an SPND 110 can be installed in the SPND installation hole 251 through the inlet slot 253. After the SPND 110 is installed in the SPND installation hole 251, the inlet slot 253 is closed by a slot cover 257 and sealed through a caulking process.

As shown in FIG. 10, a thermocouple 100 is inserted into each of the irradiation test fuel rods 30 through a thermocouple insert hole 321 of the upper end connector 325 so that a lower end of the thermocouple 100 is placed at a predetermined position in the fuel rod 30. After the thermocouple 100 is inserted into the irradiation test fuel rod 30 through the thermocouple insert hole 321, the end connector sealing nut 365 is tightened to the upper end of the upper end connector 325 with a sealing tube 105 provided around a thermocouple control cable which is placed at the upper end of the upper end connector 325. Thus, the thermocouple insert hole 321 of the upper end connector 325 is sealed.

Figure 9C:
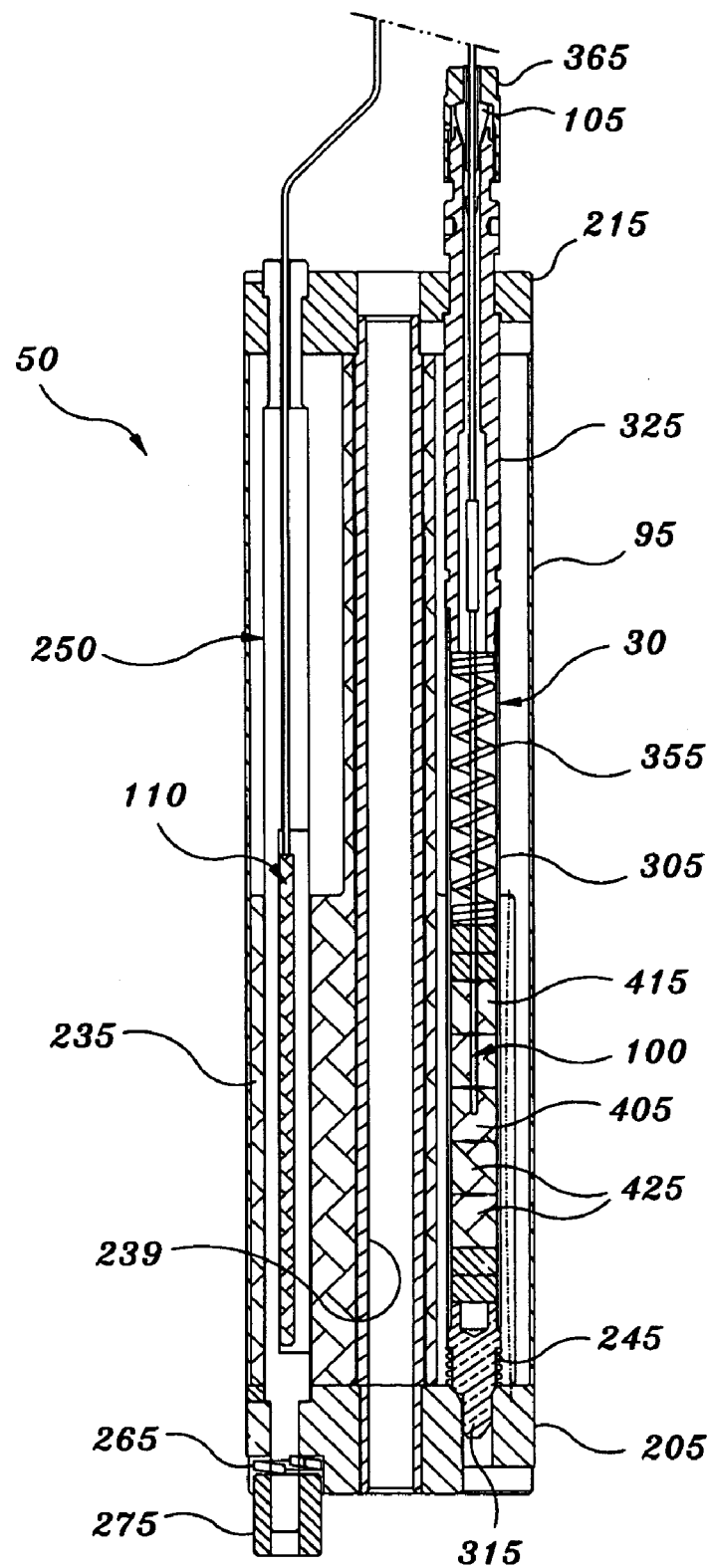

If desired to provide flexibility allowing for controlling the linear power density of the nuclear fuels in the irradiation hole according to in-core properties of the research reactor, a thermo-neutron absorption tube 95 having an inner diameter corresponding to the outer diameter of the cooling block 235 may be placed between the upper housing 215 and the lower housing 205 of the nuclear fuel rod assemblies 50 as shown in FIG. 9c.

Figure 3A:
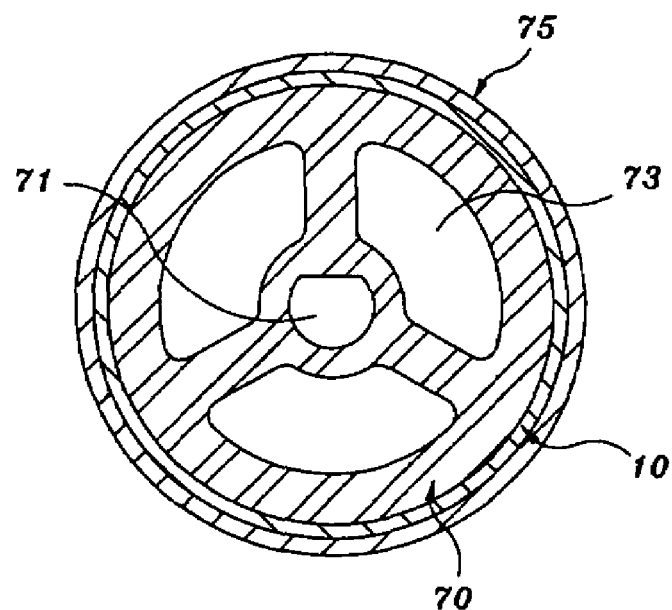
Figure 3B:
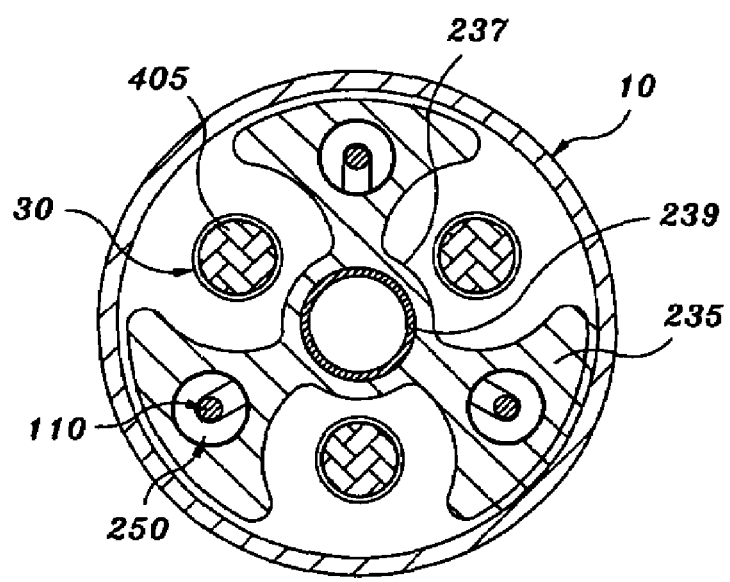
Figure 3C:
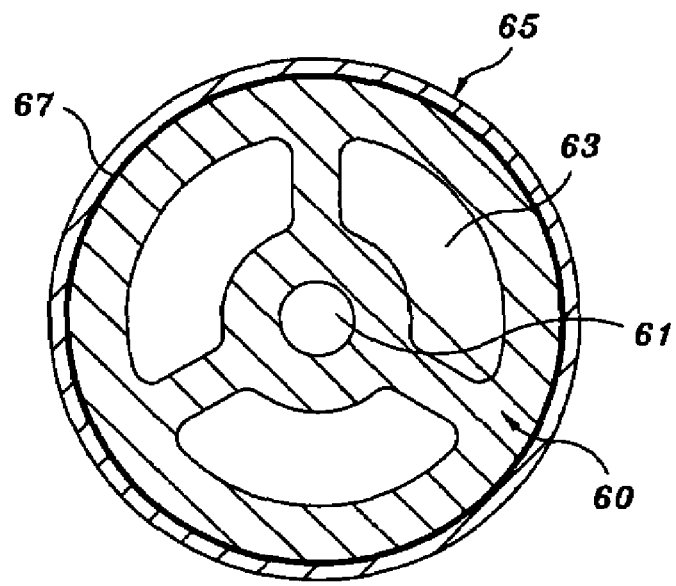

An upper end cap 65, made of aluminum or an aluminum alloy, is fitted around the upper end of the outer surface of the upper end plate 60 as shown in FIGS. 3c and 5c. To prevent the upper end cap 65 from being undesirably removed from the upper end plate 60, a cap locking ring 67 is forcibly inserted into a gap between the upper end plate 60 and the upper end cap 65. In the same manner, a lower end cap 75, made of aluminum or an aluminum alloy, is fitted around the outer surface of a junction of the shell 10 and the lower end plate 70 as shown in FIGS. 3a and 5a. To prevent the lower end cap 75 from being undesirably removed from a designated position, a cap stopper 77 is forcibly fitted around the lower end of the outer surface of the lower end plate 70.

As described above, the instrumented capsule of the present invention is provided with both the upper end cap 65 and the lower end cap 75 which are made of aluminum or aluminum alloy and placed to come into direct contact with the inner wall of the irradiation hole. Due to the upper and lower end caps 65 and 75, the upper end plate 60 and the lower end plate 70 are not brought into direct contact with the inner wall of the irradiation hole regardless of in-pile liquid vibration. Furthermore, as both the upper end cap 65 and the lower end cap 75 are made of aluminum or aluminum alloy, the end caps 65 and 75 may minimize damage to the inner wall of the irradiation hole even though the end caps 65 and 75 come into contact with the inner wall of the irradiation hole. Thus, the instrumented capsule of the present invention can be used in an irradiation test for a lengthy period while ensuring desired structural integrity and safety of both the capsule and the research reactor.

Figure 3D:
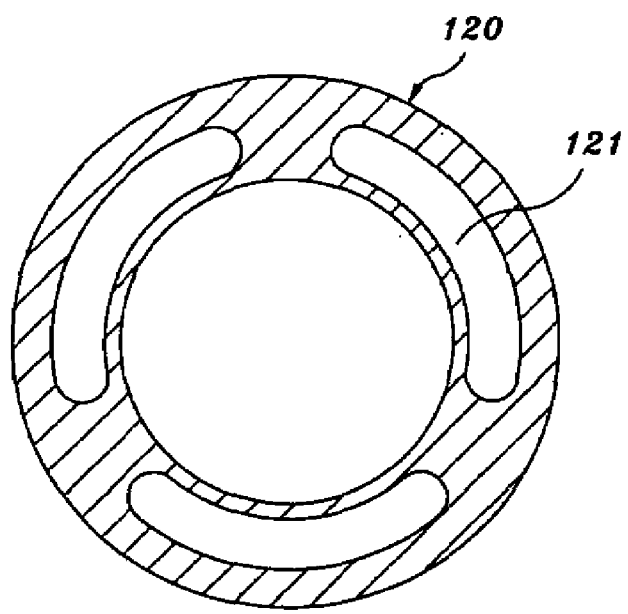
Figure 4:
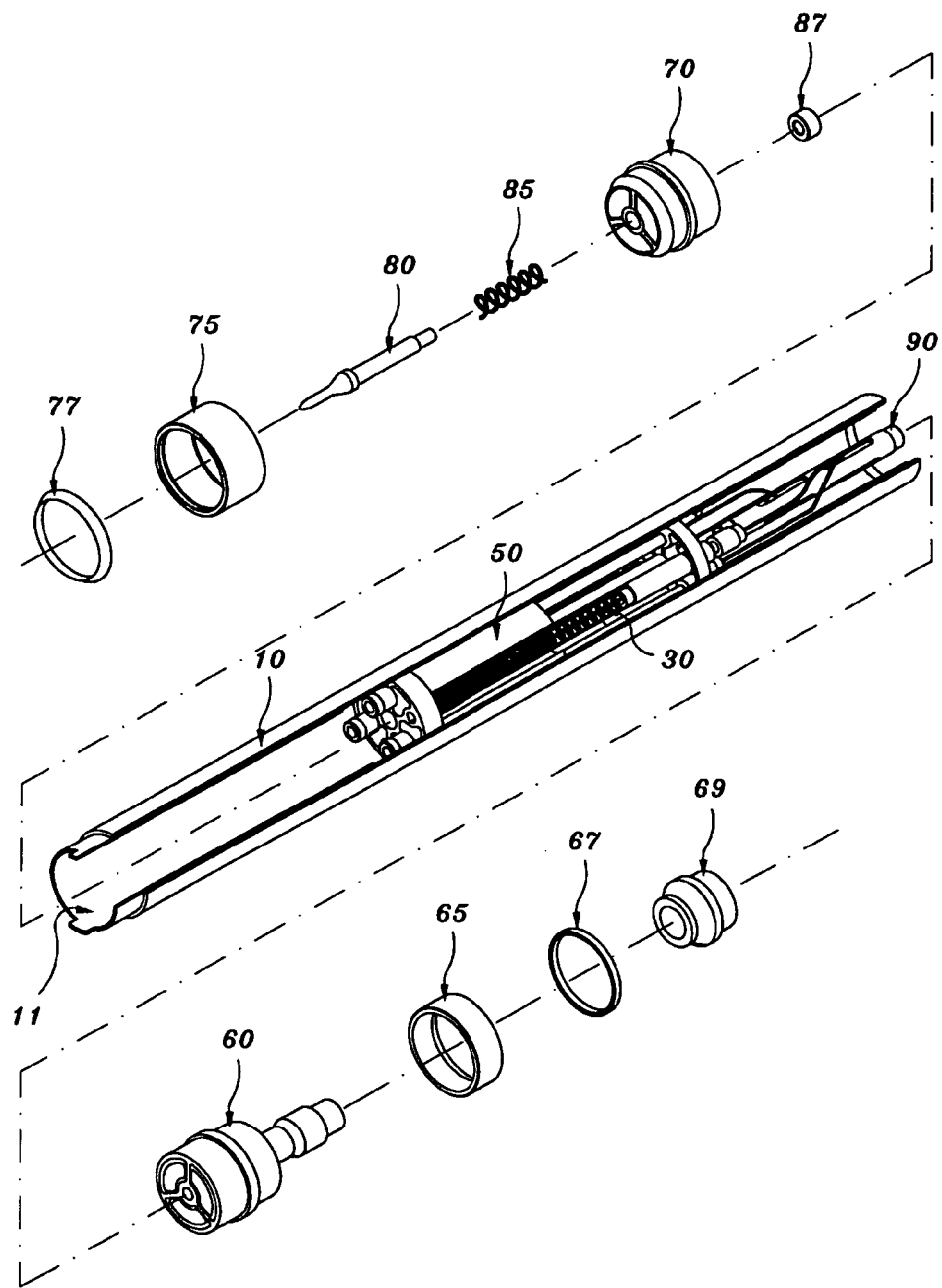
FIG. 4 is an exploded perspective view of a capsule part of the instrumented capsule for nuclear fuel irradiation tests according to the embodiment of the present invention.
Figure 12:
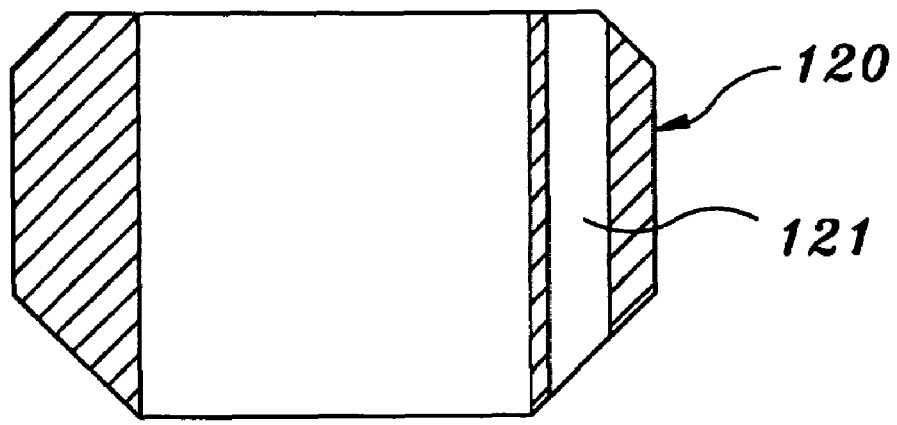
FIG. 12 is a longitudinal sectional view illustrating a lower stopper according to the embodiment of the present invention.
Figure 13:
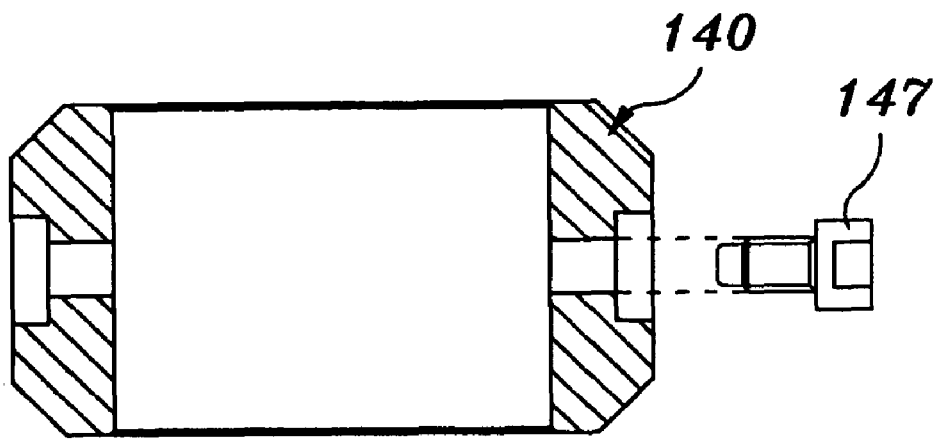
FIG. 13 is a longitudinal sectional view illustrating an upper stopper according to the embodiment of the present invention.

Furthermore, a lower stopper 120 is securely provided around the outer surface of the protective tube 130 at a position corresponding to an upper portion of the irradiation hole in a reflector of the research reactor as shown in FIG. 5c such that the lower stopper 120 is in contact with the reflector. An upper stopper 140 is securely provided around the outer surface of the protective tube 130 at a predetermined position at which the upper stopper 140 is locked to a locking clamp 5 provided at an upper portion of a chimney of the reactor 3. The lower stopper 120 is provided with a plurality of coolant flow channels 121 to minimize impact induced by the flow of the coolant as shown in FIGS. 3d and 12. An upper stopper fixing guide tube 145 having a plurality of locking holes is welded to the outer surface of the protective tube 130, while the upper stopper 140 is fitted over the fixing guide tube 145 and locked thereto by a plurality of locking screws 147.

To use the instrumented capsule of the present invention for a nuclear fuel irradiation test in a research reactor, the capsule is transported to the research reactor through a designated procedure for irradiation tests, and is installed in the in-core irradiation hole of the reactor as shown in FIG. 1. Thereafter, the instrument control cables guided by the guide pipe 180 are connected to the control unit provided outside the research reactor. The nuclear fuel irradiation test is, thereafter, executed through the designated procedure for irradiation tests.

When the instrumented capsule is completely installed in the in-core irradiation hole, the capsule is supported in the irradiation hole by the lower end cap and the upper end cap which have outer diameters larger than the diameter of the outer shell of the capsule and are in contact with an inner wall of the irradiation hole. Furthermore, a rod tip of the instrumented capsule is placed in contact with a bayonet provided on the bottom of the irradiation hole so that impact which may be applied to the capsule in an axial direction can be effectively absorbed by a support spring fitted over the rod tip. Furthermore, a lower stopper 120 and an upper stopper 140, which are mounted around the outer surface of a protective tube at predetermined lower and upper positions, are locked to an upper portion of the irradiation hole in a reflector of the research reactor and locked to a locking clamp provided at an upper portion of a chimney of the reactor, respectively, thus stably supporting the capsule. Therefore, the instrumented capsule of the present invention can be used in the nuclear fuel irradiation test for a lengthy period while securing the desired structural integrity and safety of both the capsule and the research reactor.

As described above, the present invention provides an instrumented capsule for nuclear fuel irradiation tests in research reactors. The instrumented capsule of the present invention is used to measure in real time the properties of nuclear fuels irradiated in a research reactor during a nuclear fuel irradiation test which must be executed to provide nuclear fuel irradiation test data required for the design and development of nuclear fuels. Thus, the instrumented capsule of the present invention provides a variety of irradiation test data which are required along with data obtained from post-irradiation tests in designing nuclear fuels and determining in-pile performance and structural integrity of nuclear fuels.

The instrumented capsule of the present invention can be used for irradiation tests of a variety of nuclear fuels, such as metal fuels and ceramic fuels, at the same time, and furthermore, can be used for irradiation tests of a large amount of nuclear fuels at the same time because the capsule contains a maximum of six fuel rods therein. In addition, as the capsule has improved structural integrity and improved operational reliability, the capsule can be used for a lengthy nuclear fuel irradiation test. The capsule further minimizes damage to the inner wall of the irradiation hole of the research reactor caused by mechanical vibration of the capsule induced by in-pile liquid vibration even though the capsule is irradiated in the irradiation hole for a lengthy period. Thus, the instrumented capsule of the present inventions ensures desired operational safety of the research reactor.

Furthermore, in the instrumented capsule of the present invention, a thermo-neutron absorption tube can be installed in a nuclear fuel rod assembly, thus allowing control of linear power density of the nuclear fuel in the irradiation hole. This allows the positions of the fuel rods in the irradiation hole to be controlled as desired.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A research reactor having a control unit connected thereto and containing an instrumented capsule for a nuclear fuel irradiation test, the instrumented capsule comprising:
   a capsule part comprising
   an outer shell with a predetermined length and opposite open ends,
   one or more nuclear fuel rod assemblies loaded in the outer shell and each having a plurality of irradiation test fuel rods each containing a sintered nuclear fuel body therein,
   a plurality of support tubes inserted into the outer shell to support the plurality of fuel rod assemblies in a predetermined place in the outer shell,
   an upper end plate and a lower end plate mounted to an upper end and a lower end of the outer shell, respectively, with a plurality of coolant flow channels formed in each of the upper and lower end plates and
   a rod tip assembly comprising
      a rod tip inserted into the lower end plate,
      a support spring supported by both the lower end plate and the rod tip to support a weight of the instrumented capsule and
      a rod tip support ring coupled to an upper end of the rod tip which passes upwards through the lower end plate,
   wherein the upper end plate and the lower end plate further comprise
   an upper end cap provided around an upper end of an outer surface of the upper end plate;
   a lower end cap provided around an outer surface of a junction of the outer shell and the lower end plate;
   a lower stopper provided around an outer surface of the protective tube at a predetermined position corresponding to an upper portion of an irradiation hole in a reflector of a research reactor, thus being in contact with the upper portion of an irradiation hole, the lower stopper having a plurality of coolant flow channels; and
   an upper stopper provided around the outer surface of the protective tube at a predetermined position at which the upper stopper is locked to a locking clamp provided at an upper portion of a chimney of the research reactor;
   an in-capsule instrument comprising
   a plurality of thermocouples installed in the sintered nuclear fuel body of each of the fuel rod assemblies, with an instrument control cable extending from the thermocouple to an outside of the capsule part and
   a plurality of self-powered neutron detector (SPND) placed in a housing support rod of each of the fuel rod assemblies, with an instrument control cable extending from the SPND to the outside of the capsule part, wherein the housing support rod comprises an SPND installation hole of a predetermined depth which is formed downwards from a center of an upper surface of the housing support rod;
   a protective tube connected to a top of the upper end plate by means of an upper end plate connector, and protecting the instrument control cables extending from the in-capsule instruments to the outside of the capsule part;
   a junction tree connected to an upper end of the protective tube and having both a vertical extension part and an inclined extension part, with a cable connection adapter provided at an upper end of the inclined extension part to hold the instrument control cables;

a guide pipe connected to the inclined extension part through the cable connection adapter and guiding the instrument control cables to a control unit provided outside a research reactor; and a grapple head assembly connected to an upper end of the vertical extension part to be coupled to a capsule treatment system.

2. The research reactor according to claim 1, wherein the in-capsule instrument further comprises a combination of a linear variable differential transformer (LVDT) and a bellows-shaped pressure gauge to measure variation in an inner pressure of each of the irradiation test fuel rods, or a combination of a linear variable differential transformer (LVDT) and a strain gauge to measure variation in length of the sintered nuclear fuel body of each of the irradiation test fuel rods.

3. The research reactor according to claim 1, further comprising:

a cap locking ring inserted into a gap between the upper end plate and the upper end cap to prevent the upper end cap from being removed from the upper end plate; and a cap stopper fitted around a lower end of an outer surface of the lower end plate to prevent the lower end cap from being removed from a predetermined position around the junction of the outer shell and the lower end plate.

4. The research reactor according to claim 1, wherein each of the upper end cap and the lower end cap is made of aluminum or an aluminum alloy.

5. The research reactor according to claim 1, wherein the capsule part further comprises a pair of cable guide tubes each having a plurality of longitudinal side openings, the pair of cable guide tubes are supported at a lower end by the fuel rod assemblies and at an upper end by the upper end plate.

6. The research reactor according to claim 5, wherein the instrument control cables extending from the fuel rod assemblies pass through the plurality of longitudinal side openings of the pair of cable guide tubes and a center through hole of the upper end plate.

* * * * *